United States Patent [19]

Okada et al.

[11] 4,305,865

[45] Dec. 15, 1981

[54] POLYAMIDE COMPOSITION

[75] Inventors: Takuji Okada; Teijiro Arai, both of Jyoyo; Yoshinori Ichikawa, Fujisawa; Kikuo Tanaka, Kawagoe, all of Japan

[73] Assignee: Unitika Ltd., Amagasaki, Japan

[21] Appl. No.: 155,186

[22] Filed: Jun. 2, 1980

[30] Foreign Application Priority Data

Jun. 14, 1979 [JP] Japan .................. 54-75481

[51] Int. Cl.³ .................. C08L 77/00; C08K 7/14; C08K 3/08
[52] U.S. Cl. .................. 260/42.18; 260/42.22; 260/42.46; 525/66; 525/183
[58] Field of Search .............. 525/66, 183; 260/42.18, 260/42.22, 42.46

[56] References Cited

U.S. PATENT DOCUMENTS

| | | | |
|---|---|---|---|
| 3,375,300 | 3/1968 | Ropp | 525/66 |
| 3,845,163 | 10/1974 | Murch | 260/45.75 C |

FOREIGN PATENT DOCUMENTS

| | | | |
|---|---|---|---|
| 2402942 | 11/1974 | Fed. Rep. of Germany | 525/66 |
| 2758568 | 7/1979 | Fed. Rep. of Germany | 525/66 |
| 45-30943 | 10/1970 | Japan | 525/66 |
| 45-30944 | 10/1970 | Japan | 525/66 |
| 45-30945 | 10/1970 | Japan | 525/183 |
| 55-9661 | 1/1980 | Japan | 525/66 |
| 55-9662 | 1/1980 | Japan | 525/66 |
| 1403797 | 8/1975 | United Kingdom | 525/66 |

*Primary Examiner*—Paul Lieberman
*Attorney, Agent, or Firm*—Oblon, Fisher, Spivak, McClelland & Maier

[57] ABSTRACT

A polyamide composition comprises (a) 50 to 99 wt. % of a polyamide; and (b) 50 to 1 wt. % of a modified polyolefin which is modified with 0.001 to 10 mole % of an adduct component selected from alicyclic carboxylic acids or functional derivatives thereof which has a cis-form double bond in the ring, which can be substituted with a nonmodified polyolefin at a ratio of 1 to 90 wt. parts per 100 wt. parts of said modified polyolefin.

7 Claims, No Drawings

POLYAMIDE COMPOSITION

BACKGROUND OF THE INVENTION

1. Field of the Invention

The present invention relates to a polyamide composition. More particularly, it relates to a polyamide composition having improved impact strength and fabricatability which comprises a polyamide and a modified polyolefin or olefin type elastomer (which can include a nonmodified polyolefin) if necessary with a filler.

2. Description of the Prior Arts

In usual, polyamides have excellent mechanical characteristics, heat resistance, abrasion resistance and appearance. Moreover, the polyamide compositions incorporating an inorganic filler or an organic additive such as a flame retardant have further improved heat resistance, mechanical characteristics, flame retardancy and electric characteristics. Therefore, polyamides and polyamide compositions containing a filler have been used in various fields such as engineering plastics for electric parts, mechanical parts, automobile parts; and extrusion-molding for preparing various molded goods, fibers, films and sheets. The disadvantage of the polyamide molded products have, however, a low impact strength. The polyamides have also disadvantages of inferior fabricatability especially inferior releasing property to easily cause "depression" or "flowmark" and a dimensional instability cause by water absorption, and the polyamide compositions containing an inorganic filler have inferior appearance and "curve" caused by anisotropic shrinkage in comparison with the ABS resins.

The polyamides have inferior impact strength especially in the absolute dried condition just after the melt-molding and accordingly, the polyamides have been used after absorbing water. It has been required to improve the impact strength of the polyamides for improving the molding process. Moreover, a further improved impact strength of the polyamides has been required for using the polyamide in the field of construction substrates beside the fields of functional parts.

The fact of the inferior impact strength of the polyamide molded product means an inferior resistance to cracking propagation of the molded product. This property causes notched brittleness especially brittle break at low temperature. The impact strength can be measured by ASTM D-256 the notched Izod impact strength test or "the weigh falling impact strength".

In order to improve such disadvantages of the polyamide it has been proposed to incorporate various additives in the polyamide, for example, (1) the method of improving the impact strength by melt-blending at least 50 wt.% of a polyamide to an olefin copolymer having an acid component having $\alpha,\beta$-ethylenic unsaturated carboxylic acid group (Belg. Pat. No. 641,952); (2) the method of improving a toughness of weld-line of a polyamide by incorporating an olefin copolymer having $\alpha,\beta$-ethylenically unsaturated carboxylic acid component (more than 10% is neutralized with a metal ion) i.e. ionomer resin in at least 60 wt.% of a polyamide (U.S. Pat. No. 3,845,163); (3) the method of improving an impact strength and a fabricatability of a polyamide composition by incorporating a copolymer made of an alkyl ethylenically unsaturated carboxylate, an unsaturated carboxylic acid and a metal salt of unsaturated carboxylic acid in at least 50 wt.% of a polyamide (Japanese Examined Patent Publication No. 4743/1979) and the method of improving an impact strength by modifying an elastomer with epoxy group and oxy functional group and chemically bonding the product to a polyamide (Japanese Unexamined Patent Publication No. 6693/1975).

The compositions disclosed in the prior arts of the above-mentioned Belgian Patent, U.S. Patent and Japanese Patent Publications are not satisfactory in view of the improvement of impact strength of molded products made of a polyamide composition. Moreover, the compositions have inferior mechanical characteristics and heat resistance to those of the polyamide itself. Therefore, the applications of polyamide compositions in the field of engineering plastics are quite limited. For example, the polyamide composition as the ionomer resin is easily colored into yellow color by an effect of heat or oxygen in comparison with a polyamide itself.

SUMMARY OF THE INVENTION

It is an object of the present invention to overcome the above-mentioned disadvantages and to provide a polyamide composition having an improved impact strength under maintaining excellent characteristics of a polyamide.

The foregoing and other objects of the present invention have been attained by providing composition which comprises (a) 50 to 99 wt.% of a polyamide; and (b) 50 to 1 wt.% of a modified polyolefin which is modified with 0.001 to 10 mole % of an adduct component selected from alicyclic carboxylic acids or functional derivatives thereof which has a cis-form double bond in the ring, which can be substituted with a nonmodified polyolefin at a ratio of 1 to 90 wt. parts per 100 wt. parts of said modified polyolefin.

In the polyamide composition of the invention, said polyolefin is an olefin type elastomer.

The polyamide composition of the invention can further comprises 90 to 2 wt. parts of a filler and 10 to 98 wt. parts of 10 to 98 wt. parts of said polyamide composition. The present invention is also to provide a process for producing said polyamide compositions.

DETAILED DESCRIPTION OF THE PREFERRED EMBODIMENTS

The present invention is distinguished from the prior art using $\alpha,\beta$-unsaturated carboxylic acid, an ester of said carboxylic acid or a partially neutralized metal salt of said carboxylic acid as the ionomer as the functional groups for easily reactive to a polyamide. The present invention is characterized by using an alicyclic carboxylic acid or its functional derivative which has cis-form double bond in the ring.

The mechanism for improving impact strength of the polyamide composition by incorporating said alicyclic carboxylic acid or its functional derivative is not clarified. Thus, it is considered as follows. The alicyclic carboxylic acid having cis-form double bond in the ring has high reactivity of carbonyl group ($>C=O$) caused by the distortion of the molecule to increase an affinity to an amino terminal group or an amide bond of the polyamide. Therefore, the chemical affinity of the dispersed modified polyolefin in the continuous polyamide phase is increased whereby reinforcing structure having high bonding force is formed in the polyamide phase.

Suitable polyamide used in the composition of the present invention nylons having a molecular weight of more than 10,000 which are obtained by a condensation of a $C_2$–$C_{20}$ saturated dibasic acid with a $C_2$–$C_{20}$ alkyl-diamine at an equal molar ratio, such as homopolymers such as nylon 66, nylon 6.10 and nylon 6T; copolymers and terpolymers such as nylon 6/66 and nylon 6/12; and linear polymers having acid amide bond —CONH— which are obtained by a self-condensation of a lactam or an amino acid such as nylon 6 and nylon 12.

Suitable polyolefins used in the composition of the present invention include homopolymers of olefin such as polyethylene, polypropylene and polybutene-1; and copolymers of different olefins or copolymers of an olefin and a different monomer such as ethylene-propylene copolymer, ethylene-butene-1 copolymer, propylene-butene-1-copolymer, ethylene-vinyl acetate copolymer and ethylene-propylene-diene copolymer. The copolymers can be random copolymers, block copolymers, graft copolymers and alternate polymers. It is especially preferable to use ethylene-propylene copolymer, ethylene-butene-1 copolymer, ethylene-vinyl acetate copolymer, and ethylene-propylene-diene copolymer. Two or more polyolefins can be used.

Suitable alicyclic carboxylic acids having cis-form double bond in the ring used for the modification of the present invention include cis-4-cyclohexene-1,2-dicarboxylic acid, endo-bicyclo-[2.2.1]-5-heptene-2,3-dicarboxylic acid, methyl endo-cis-bicyclo-[2.2.1]-5-heptene-2,3-dicarboxylate, endo-bicyclo-[2.2.1]-1,2,3,4,7,7-hexachloro-2-heptene-5,6-dicarboxylic acid.

The functional derivatives of said alicyclic carboxylic acid include acid anhydrides, esters, acid amides, acid halides and metal salts of said alicyclic carboxylic acid. It is especially preferable to use endo-bicyclo-[2.2.1]-5-heptene-2,3-dicarboxylic acid or its anhydride.

The functional derivative need not always to be formed before adding to the polyolefin. For example, the alicyclic carboxylic acid can be converted during the modification of the polyolefin or after blending to form a polyamide composition.

The modified polyolefin means a polyolefin modified with an adduct of at least one compound selected from the group consisting of alicyclic carboxylic acids having cis-form double bond in the ring or functional derivatives thereof.

The modified polyolefins can be produced by various processes preferably by heat-melting a mixture of said polyolefin and said alicyclic carboxylic acid or a functional derivative thereof and a radical initiator for example, an organic peroxide such as di-tertiarybutylperoxide, dicumylperoxide and benzoylperoxide or heating an aqueous suspension of said polyolefin and said alicyclic carboxylic acid or a functional derivative thereof in the presence of said radical initiator or a water soluble peroxide.

A ratio of said alicyclic carboxylic acid and/or functional derivative thereof to the polyolefin is depending upon the usage of the polyamide composition, kinds and ratio of the polyolefin and kinds of said alicyclic carboxylic acid or functional derivative thereof and preferably in the range of 0.001 to 10 mol.% especially 0.01 to 1.0 mol.% for the adduct.

When the ratio of the alicyclic carboxylic acid or functional derivative is less than 0.001 mol.%, a satisfactory effect for improving the impact strength is not found whereas when it is more than 10.0 mol.%, side reactions such as degradation and gelation of polyolefin are caused. Therefore, a special modification process is disadvantageously required.

A content of the polyamide in the composition of the polyamide and the modified polyolefin (including the nonmodified polyolefin) is usually in a range of 50 to 99 wt.% especially 65 to 90 wt.%.

In the composition of the polyamide, the modified polyolefin (including the nonmodified polyolefin), a content of the polyamide is in a range of 50 to 99 wt.%; a content of a total of the carboxylated polyolefin and the nonmodified polyolefin is in a range of 1 to 50 wt.%. A ratio of the nonmodified polyolefin to the carboxylated polyolefin is less than 45 wt.%.

When the content of the polyamide is less than 50 wt.%, excellent characteristics of the polyamide as flexural modulus and thermal deformation temperature are lost whereas when it is more than 99 wt.%, the effect for improving the impact strength is not remarkable.

Suitable fillers added to the composition of the present invention include glass fiber, asbestos, talc, calcium carbonate, calcium sulfate, silica, kaolin, bentonite, metallic powder such as zinc, lead, copper and iron powder, metal foil, metal fiber carbon black, carbon fiber as inorganic fillers and rayon, polyvinyl fiber as organic fillers.

The polymer compositions obtained by melt-blending of the polyamide composition of the present invention with a thermoplastic resin such as polyester resin, polycarbonate resin, polyacetal resin and polyarylate resin have superior mechanical strength especially superior impact strength in comparison with the composition obtained by melt-blending of the polyamide itself with such thermoplastic resin.

When the filler is incorporated, it is preferable to incorporate 10 to 98 wt. parts of the polyamide composition of the polyamide, the modified polyolefin and the nonmodified polyolefin and 90 to 2 wt. parts of the filler. The ratio is selected depending upon the object, the use and the kind of the filler. For example, when a glass fiber is used as the filler, it is preferable to incorporate 90 to 60 wt.% especially 75 to 65 wt.% of the polyamide composition (the polyamide and the modified and nonmodified polyolefins). When talc or kaolin is used as the filler, it is preferable to incorporate 80 to 30 wt.% of the polyamide composition (the polyamide and the modified and nonmodified polyolefins). When iron powder is used as the filler, it is preferable to incorporate 70 to 10 wt.% of the polyamide composition (the polyamide and the modified and nonmodified polyolefins).

The content of the filler depends upon the object, the use and the kind of the filler. When the content of the filler is less than 2 wt.%, the improvement of the heat resistance, the mechanical strength and the dimensional stability is not satisfactory whereas when it is more than 90 wt.%, the impact strength, the processability and the appearance of the molded product are not satisfactory.

In the process for producing the polyamide composition, these components are melt-blended. Various methods can be employed. For example, (1) the mixture of the polyamide, the modified polyolefin or the mixture of the polyamide, the modified and nonmodified polyolefins with or without the filler is melt-blended by a conventional apparatus such as a banbury mixer, a rotary spreader, or a uniaxial or biaxial extruder; (2) the polyamide and the nonmodified polyolefin with the alicyclic carboxylic acid or its functional derivative and the radical initiator are simultaneously blended to modify the polyolefin during the formation of the polyamide composition. The nonmodified polyolefin and/or the filler can be further added to the polyamide composition and the mixture is melt-blended; (3) the polyamide and the modified polyolefin or the polyamide and the modified and nonmodified polyolefins are melt-blended and then, the filler is added and the mixture is melt-blended; (4) the polyamide, the polyolefin the radical initiator, the alicyclic carboxylic acid or its functional derivative and the filler are mixed and the mixture is melt-blended.

In the polyamide composition, it is possible to incorporate the other additive such as a dye, a pigment, a heat resistant agent, an antioxidant, an ultraviolet-absorbent, antislipping agent, a plasticizer, a nuclear agent, a foaming agent and a luster agent.

The characteristics of the polyamide composition of the present invention will be illustrated.

The polyamide composition of the present invention or the blend of the polyamide composition and another polymer has remarkably improved impact strength. In the melt-fluidity characteristics of the composition, the polyamide composition has superior shearing rate dependency to that of a polyamide itself so as to remarkably improve fabricatability in an injection molding as well as an extrusion molding. For example, an apparent melt-viscosity is remarkably improved in a low shearing rate region to impact excellent fabricatability in an extrusion molding for molding a pipe or a gut. Moreover, a mold release characteristic is remarkably improved to be capable of molding various complicated products without any special consideration of a mold release agent. The appearance of the molded product such as color and gloss can be remarkably improved.

The present invention will be further illustrated by certain examples and references which are provided for purposes of illustration only and are not intended to be limiting the present invention.

The test methods for the evaluations in the examples and references are as follows.

(1) Izod impact test

An Izod impact strength was measured by ASTM D-638 for a sample having a size of ½ inch × ½ inch × 2.5 inch with a notch.

(2) Weight falling test

Sample: a disc having a diameter of 100 mm and a thickness of 2 mm.

Test condition: semispherical head of the weight having a diameter of 20.0 mm.

Weight: 7.5 kg.

A height of the weight for breaking 50% of the samples under said condition was measured as a unit of kg cm.

(3) Flexural modulus

A flexural modulus was measured by ASTM D-790 for a sample having a size of ¼ inch × ½ inch × 5 inch.

(4) Tensile strength

A tensile strength was measured by ASTM D-638 for a dumbbell having a thickness of ⅛ inch.

(5) Heat distortion temperature

A heat distortion temperature was measured by ASTM D-648 for a sample having a size of ½ inch × ½ inch × 5 inch under a weight of 18.56 kg/cm².

(6) Luster

A luster was measured by ASTM D-523-62T at an incident angle of 20° with a mirror flat plate having a thickness of 2 mm.

EXAMPLE 1

A mixture of 1,000 wt. parts of ethylene-propylene copolymer (referring to as EPR) having a melt index of 2.0 g/10 min./190° C. and an ethylene content of 72.0%, 3 wt. parts of endo-bicyclo-[2.2.1]-5-heptene-2,3-dicarboxylic anhydride (referring to as bicyclodicarboxylic acid anhydride) and 1 wt. part of di-t-butylperoxide was mixed by Henschel mixer at the ambient temperature. The mixture was melt extruded by an uniaxial extruder at 200° C. to form a cylindrical pellet having a diameter of 2 mm and a length of 3 mm whereby a modified polyolefin was obtained. Then, 10 wt. parts of the modified polyolefin and 90 wt. parts of a pellet made of nylon-6 having a relative viscosity measured by Japanese Industrial Standard K-6810 in 98% conc. $H_2SO_4$ of 2.40 were dry-blended and extruded by an uniaxial extruder at 260° C. to obtain a cylindrical pellet having a diameter of 2 mm and a length of 3 mm.

A melt-viscosity of the resulting pellet of polyamide composition was measured by Flow tester (Koka type) at 250° C. and a shearing velocity of $3 \times 10^2$ sec.$^{-1}$.

Samples for evaluations of physical properties were prepared from the pellet of the polyamide composition by an injection molding machine. The test results are shown in Table 1.

EXAMPLES 2 to 13

Ethylene-propylene copolymer (EPR), ethylene-butene-1 copolymer (referring to as E/B copolymer), ethylene-vinyl acetate copolymer (referring to as EVA), polypropylene (referring to as PP) or polyethylene (referring to as PE) was used as the polyolefin and endo-bicyclo[2.2.1]-5-heptene-2,3-dicarboxylic anhydride (referring to as bicyclodicarboxylic acid) or methyl endo-bicyclo[2.2.1]-5-heptene-2,3-dicarboxylate (referring to as bicyclocarboxylic ester) was used as the alicyclic dicarboxylic acid having cis-form double bond in the ring or its functional derivative in the process of Example 1 to obtain each modified polyolefin pellet having a content of the adduct of bicyclocarboxylic acid or ester of 0.1 to 0.3 wt.%. Each modified polyolefin pellet and nylon-6 or nylon-66 were blended at a ratio of the modified polyolefin to the polyamide of 2/98 to 50/50 by weight and the mixture was respectively extruded by an uniaxial extruder or a biaxial extruder to obtain each polyamide composition pellet.

In accordance with the tests of Example 1, the tests for physical properties of each polyamide composition were carried out. The results are shown in Table 1.

EXAMPLES 14 to 16

The modified polyolefin pellet obtained by the process of Example 1 was blended to nylon-6 used in Example 1 at a ratio of 20/80 by weight and the mixture was melt-extruded by the uniaxial extruder or the biaxial extruder by the process of Example 1 to obtain polyamide composition pellets. Glass fiber, talc or carbon black as a filler was added to the polyamide composition and each mixture was melt-blended to obtain polyamide compositions containing each filler.

In accordance with the tests of Example 1, the tests for physical properties of each polyamide composition were carried out. The results are shown in Table 1.

REFERENCES 1 to 4

In accordance with the process of Example 1 except using only nylon-6 as the polyamide in Reference 1; or using an ionomer of Himilan #1706 (manufactured by Mitsui Polychemical K.K.) and nylon-6 at a ratio of 20:80 by weight in Reference 2, each polyamide composition was obtained.

In accordance with the process of Example 1 except using maleic anhydride instead of the bicyclocarboxylic acid in Example 2 or Example 12, each polyamide composition was obtained in Reference 3 or Reference 4 respectively.

In accordance with the tests of Example 1, the tests for physical properties of each polyamide composition were carried out. The results are shown in Table 1.

TABLE 1

| Example | 1 | 2 | 3 | 4 | 5 |
|---|---|---|---|---|---|
| Modified polyolefin | | | | | |
| Kind of polyolefin | EPR | EPR | EPR | EPR | EPR |
| Melt index(g/10 min) | 2.0 | 2.0 | 2.0 | 2.0 | 2.0 |
| Modifier | BDCH | BDCH | BDCH | BDCH | BDCH |
| Content of adduct of modifier (wt. %) | 0.1 | 0.1 | 0.1 | 0.1 | 0.1 |
| Temperature for modification(°C.) | 200 | 200 | 200 | 200 | 200 |
| Polyamide | | | | | |
| Kind | nylon-6 | nylon-6 | nylon-6 | nylon-66 | nylon-66 |
| Relative viscosity | 2.40 | 2.40 | 2.40 | 2.60 | 2.60 |
| Polyamide composition | | | | | |
| Process for composition content of modified | Uniext. | Uniext. | Uniext. | Uniext. | Biext. |
| Polyolefin(wt.part) | 11 | 25 | 67 | 25 | 25 |
| Content of polyamide (wt.part) | 100 | 100 | 100 | 100 | 100 |
| Temperature in melt-blending(°C.) | 260 | 260 | 260 | 280 | 280 |
| Melt-viscosity of polyamide composition (poise) | 3200 | 3800 | 4500 | 6500 | 6900 |
| Filler | | | | | |
| Kind | — | — | — | — | — |
| Content of filler (wt.part) | — | — | — | — | — |
| Content of polyamide composition(wt.part) | — | — | — | — | — |
| Evaluated physical property: | | | | | |
| Izod impact strength (kg./cm/cm notch) | 20 | 60 | 80 | 73 | 80 |
| Weigh falling impact strength(kg/cm) | 420 | 600 | 770 | 500 | 530 |
| Flexural modulus (kg/cm$^2$) | 21000 | 17500 | 15000 | 21300 | 21000 |
| Tensile strength (kg/cm$^2$) | 620 | 520 | 440 | 540 | 550 |
| Heat distortion temperature(°C.) | 62 | 60 | 60 | 65 | 65 |
| Luster (%) | 91 | 95 | 96 | 94 | 96 |

| Example | 6 | 7 | 8 | 9 | 10 |
|---|---|---|---|---|---|
| Modified polyolefin | | | | | |
| Kind of polyolefin | EPR | EPR | EPR | EPR | E/B cop. |
| Melt index(g/10 min) | 2.0 | 2.0 | 2.0 | 2.0 | 3.0 |
| Modifier | BDCH | BDCE | BDCH | BDCH | BDCH |
| Content of adduct of modifier (wt. %) | 0.3 | 0.1 | 0.1 | 0.1 | 0.1 |
| Temperature for modification(°C.) | 200 | 200 | 200 | 200 | 200 |
| Polyamide | | | | | |
| Kind | nylon-6 | nylon-6 | nylon-6 | nylon-6 | nylon-6 |
| Relative viscosity | 2.40 | 2.40 | 2.40 | 2.40 | 2.40 |
| Polyamide composition | | | | | |
| Process for composition content of modified | Uniext. | Uniext. | Uniext. | Uniext. | Uniext. |
| Polyolefin(wt.part) | 25 | 25 | 3 | 100 | 25 |
| Content of polyamide (wt.part) | 100 | 100 | 100 | 100 | 100 |
| Temperature in melt-blending(°C.) | 260 | 260 | 260 | 260 | 260 |
| Melt-viscosity of polyamide composition (poise) | 4000 | 3700 | 3100 | 6200 | 4100 |
| Filler | | | | | |
| Kind | — | — | — | — | — |
| Content of filler (wt.part) | — | — | — | — | — |
| Content of polyamide composition(wt.part) | — | — | — | — | — |
| Evaluated physical property: | | | | | |
| Izod impact strength (kg./cm/cm notch) | 95 | 60 | 10 | 100 over | 67 |
| Weigh falling impact strength(kg/cm) | 980 | 620 | 230 | 1360 | 500 |
| Flexural modulus (kg/cm$^2$) | 19000 | 18400 | 22800 | 13500 | 19000 |
| Tensile strength (kg/cm$^2$) | 590 | 540 | 810 | 380 | 590 |
| Heat distortion temperature(°C.) | 58 | 58 | 65 | 52 | 61 |
| Luster (%) | 95 | 93 | 83 | 93 | 98 |

| Example | 11 | 12 | 13 | 14 | 15 |
|---|---|---|---|---|---|
| Modified polyolefin | | | | | |
| Kind of polyolefin | EVA | PP | PE | EPR | EPR |
| Melt index(g/10 min) | 4.0 | 2.0 | 1.0 | 2.0 | 2.0 |
| Modifier | BDCH | BDCH | BDCH | BDCH | BDCH |
| Content of adduct of modifier (wt. %) | 0.1 | 0.1 | 0.1 | 0.1 | 0.1 |
| Temperature for modification(°C.) | 200 | 200 | 200 | 200 | 200 |
| Polyamide | | | | | |
| Kind | nylon-6 | nylon-6 | nylon-6 | nylon-6 | nylon-6 |
| Relative viscosity | 2.40 | 2.40 | 2.40 | 2.40 | 2.40 |
| Polyamide composition | | | | | |
| Process for composition content of modified | Uniext | Uniext | Uniext | Uniext | Biext |
| Polyolefin(wt.part) | 25 | 25 | 25 | 25 | 25 |
| Content of polyamide (wt.part) | 100 | 100 | 100 | 100 | 100 |
| Temperature in melt-blending(°C.) | 260 | 260 | 260 | 260 | 260 |
| Melt-viscosity of polyamide composition (poise) | 3600 | 3200 | 3900 | — | — |
| Filler | | | | | |
| Kind | — | — | — | GF | Talc |
| Content of filler (wt.part) | — | — | — | 43 | 67 |
| Content of polyamide composition(wt.part) | — | — | — | 100 | 100 |
| Evaluated physical property: | | | | | |
| Izod impact strength (kg./cm/cm notch) | 53 | 13 | 25 | 85 | 25 |
| Weigh falling impact strength(kg/cm) | 460 | 230 | 260 | 470 | 210 |
| Flexural modulus (kg/cm$^2$) | 18500 | 20500 | 17500 | 60000 | 55000 |
| Tensile strength (kg/cm$^2$) | 500 | 680 | 490 | 1350 | 780 |
| Heat distortion temperature (°C.) | 61 | 63 | 60 | 205 | 167 |
| Luster (%) | 90 | 91 | 78 | 65 | 88 |

| Example/Reference | Exp. 16 | Ref. 1 | Ref. 2 | Ref. 3 | Ref. 4 |
|---|---|---|---|---|---|
| Modified polyolefin | | | | | |
| Kind of polyolefin | EPR | — | HIM | EPR | PP |
| Melt index(g/10 min) | 2.0 | — | 0.7 | 2.0 | 2.0 |

TABLE 1-continued

| Modifier | BDCH | — | — | MA | MA |
|---|---|---|---|---|---|
| Content of adduct of modifier (wt. %) | 0.1 | — | — | 0.1 | 0.3 |
| Temperature for modification(°C.) | 200 | — | 200 | 200 | 200 |
| Polyamide | | | | | |
| Kind | nylon-6 | nylon-6 | nylon-6 | nylon-6 | nylon-6 |
| Relative viscosity | 2.40 | 2.40 | 2.40 | 2.40 | 2.40 |
| Polyamide composition | | | | | |
| Process for composition content of modified | Biext. | — | Uniext. | Uniext. | Uniext. |
| Polyolefin(wt.part) | 25 | — | Ion | 25 | 25 |
| Content of polyamide (wt.part) | 100 | 100 | 100 | 100 | 100 |
| Temperature in melt-blending(°C.) | 260 | 260 | 260 | 260 | 260 |
| Melt viscosity of polyamide composition (poise) | — | 3000 | 4000 | 3800 | 4600 |
| Filler | | | | | |
| Kind | CB | — | — | — | — |
| Content of filler (wt.part) | 18 | — | — | — | — |
| Content of polyamide composition(wt.part) | 100 | — | — | — | — |
| Evaluated physical property: | | | | | |
| Izod impact strength (kg./cm/cm notch) | 45 | 6 | 17 | 50 | 52 |
| Weigh falling impact strength(kg/cm) | 440 | 130 | 260 | 460 | 480 |
| Flexural modulus (kg/cm$^2$) | 22000 | 23000 | 16500 | 17200 | 16800 |
| Tensile strength (kg/cm$^2$) | 500 | 820 | 510 | 520 | 490 |
| Heat distortion temperature(°C.) | 91 | 65 | 57 | 58 | 57 |
| Luster (%) | 91 | 69 | 78 | 81 | 88 |

Note:
BDCH: endo-bicyclo-[2.2.1]-5-heptene-2,3-dicarboxylic anhydride
BDCE: methyl endo-bicyclo-[2.2.1]-5-heptene-2,3-dicarboxylic
Uniext: uniaxial extruder
Biext: biaxial extruder
GF: glass fiber
Talc: talc
CB carbon black
HIM: Himilan #1706
Ion: Ionomer 25
MA: maleic anhydride

We claim:

1. A polyamide composition, comprising:
    (a) 50 to 99 wt.% of a polyamide; and (b) 50 to 1 wt.% of a polyolefin component, said polyolefin component being a polyolefin modified with 0.001 to 10 mole % of a compound selected from the group consisting of alicyclic carboxylic acids or derivatives thereof, wherein the alicyclic ring of said compound contains a double bond in the cis configuration, or said polyolefin component being a mixture of 1 to 90 parts by weight of an unmodified polyolefin per 100 parts by weight of said modified polyolefin.

2. The polyamide composition of claim 1, wherein said polyolefin is an olefinic elastomer.

3. The polyamide composition of claim 1 or 2, which further comprises from 90 to 2 parts by weight of a filler and 10 to 98 parts by weight of said polyamide composition.

4. The polyamide composition of claim 1, wherein said alicyclic carboxylic acid is cis-4-cyclohexene-1,2-dicarboxylic acid, endo-bicyclo-[2,2,1]-5-heptene-2,3-dicarboxylic acid, methyl endo-cis-bicyclo-[2,2,1]-5-heptene-2,3-dicarboxylte, endo-bicyclo-[2,2,1]-1,2,3,4,7,7-hexachloro-2-heptene-5,6-dicarboxylic acid.

5. The polyamide composition of claim 1, wherein said polyolefin is polyethylene, polypropylene, polybutene-1, an ethylene-propylene copolymer, an ethylene-butene-1 copolymer, a propylene-butene-1 copolymer, an ethylene-vinylacetate copolymer, or an ethylene-propylene-diene copolymer.

6. The polyamide composition of claim 3, wherein said filler is glass fiber, asbestos, talc, calcium carbonate, calcium sulfate, silica, kaolin, bentonite, powdered zinc, powdered lead, powdered copper, powdered iron, metal foil, metal fiber, carbon black, carbon fiber, or polyvinyl fiber.

7. A process for preparing a polyamide composition, comprising:
    (a) preparing a modified polyolefin component by heating a mixture of a polyolefin or olefin elastomer and a compound selected from the group consisting of alicyclic carboxylic acids or derivatives thereof, wherein the alicyclic ring of said compound contains a double bond in the cis configuration, in the presence of a radical initiator, and (b) melt-blending said modified polyolefin component with a polyamide.

* * * * *